(12) United States Patent
Clarke et al.

(10) Patent No.: US 8,641,486 B1
(45) Date of Patent: Feb. 4, 2014

(54) VENTING BLADE ASSEMBLY FOR POULTRY PROCESSING

(75) Inventors: Robert Clarke, Rogers, AR (US); Mark Dale Vineyard, Monett, MO (US)

(73) Assignees: M and M Poultry Equipment, Inc., Hollister, MO (US); Tyson Foods, Inc., Springdale, AR (US)

( * ) Notice: Subject to any disclaimer, the term of this patent is extended or adjusted under 35 U.S.C. 154(b) by 516 days.

(21) Appl. No.: 12/947,360

(22) Filed: Nov. 16, 2010

(51) Int. Cl.
 *A22C 21/06* (2006.01)
(52) U.S. Cl.
 USPC ........................................ 452/122
(58) Field of Classification Search
 USPC .......................................... 452/122, 106, 120
 See application file for complete search history.

(56) References Cited

U.S. PATENT DOCUMENTS

| | | | |
|---|---|---|---|
| 4,819,811 A | 4/1989 | Ewing et al. | |
| 4,899,890 A | 2/1990 | Ewing et al. | |
| 5,482,503 A | 1/1996 | Scott et al. | |
| 5,580,304 A | 12/1996 | Bleth et al. | |
| 5,597,350 A | 1/1997 | Hunking et al. | |
| 5,741,176 A * | 4/1998 | Lapp et al. | 452/122 |
| 5,791,837 A * | 8/1998 | Johnson | 408/204 |
| 5,873,775 A | 2/1999 | Landahl et al. | |
| 6,152,815 A * | 11/2000 | Meerdink et al. | 452/122 |
| 6,371,843 B1 * | 4/2002 | Volk et al. | 452/106 |
| 7,175,516 B2 | 2/2007 | Clarke | |
| 2002/0060145 A1 | 5/2002 | Doerfer et al. | |
| 2007/0105675 A1 | 5/2007 | Clarke | |
| 2008/0166960 A1 | 7/2008 | Clarke | |
| 2008/0179105 A1 * | 7/2008 | Duncan | 175/420.1 |

\* cited by examiner

*Primary Examiner* — Richard Price, Jr.
(74) *Attorney, Agent, or Firm* — Head, Johnson & Kachigian, P.C.

(57) ABSTRACT

A venting blade assembly for poultry processing. The venting blade assembly includes a projecting cylindrical barrel having an open first end. An attachment mechanism attaches an opposed second end of the cylindrical barrel to an axial advancement and rotation mechanism. A flat circular abutment shoulder at the first end is substantially perpendicular to the cylindrical barrel in order to engage the poultry. The first end of the cylindrical barrel also includes a beveled circular edge. A plurality of helical recesses in the first end of the cylindrical barrel forms a plurality of cutting tips.

9 Claims, 5 Drawing Sheets

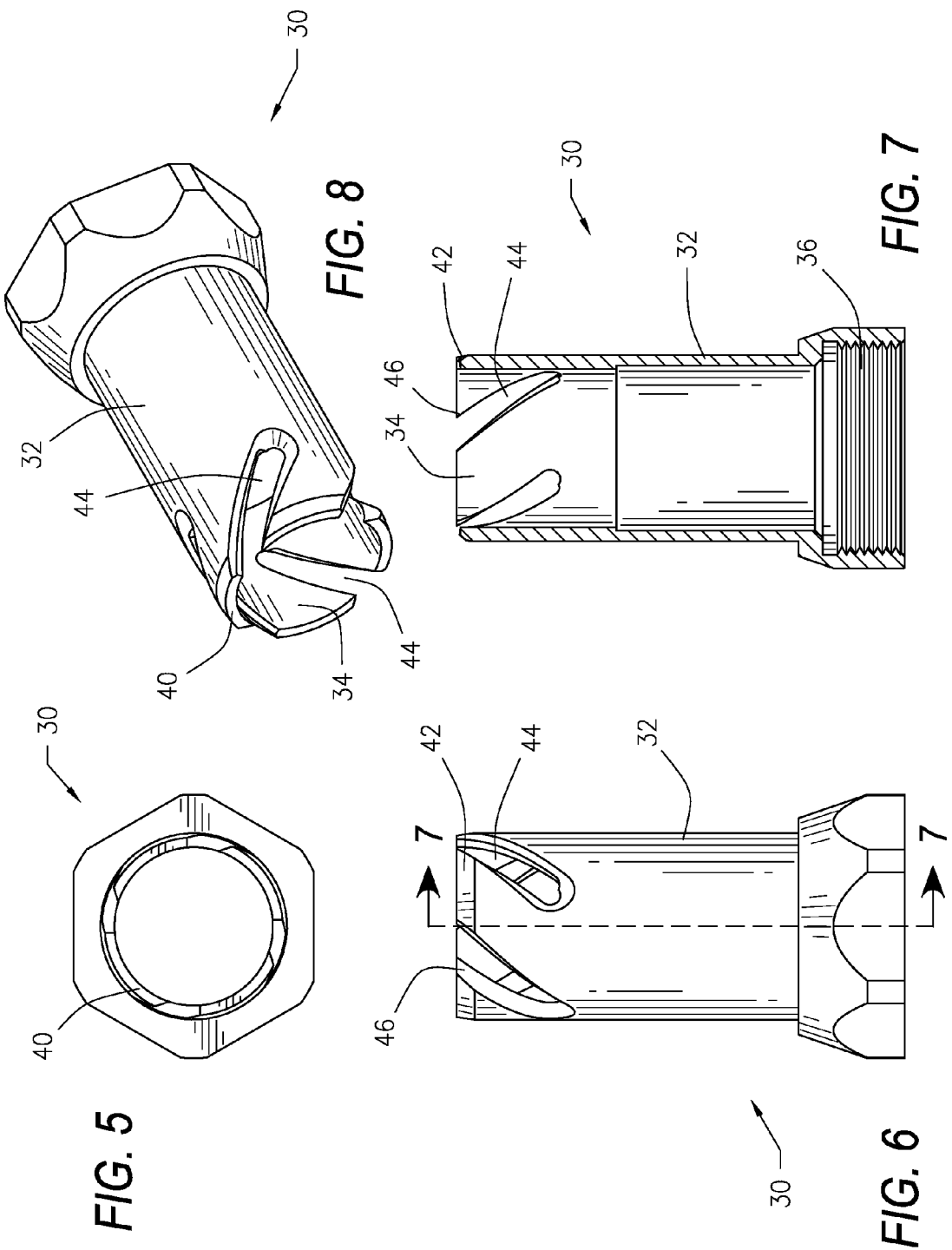

VENTING BLADE ASSEMBLY FOR POULTRY PROCESSING

BACKGROUND OF THE INVENTION

1. Field of the Invention

The present invention relates to a venting blade assembly for use in a venting operation during poultry processing. In particular, the present invention is directed to a venting blade assembly which effectively performs the venting operation while maximizing yield.

2. Prior Art

Poultry processing today is a mechanized and automated system for transforming live birds into food products. By way of example, one poultry operation may process over a million birds per week. While processing operations may vary, in a typical process, the poultry are individually moved from cages or boxes and then hung by their feet upside down with the necks down. The birds are hung on shackles or hooks by their feet on a moving conveyer line or chain. The birds are then moved from station to station for sequential processing.

The birds are initially stunned with electricity and then conveyed to a neck cutter. Blood is then allowed to drain from the birds. The carcasses are then either immersed in hot water or sprayed with steam in order to scald the skin, which loosens the feathers. The carcasses are then moved by the conveyer belt to automatic feather picking machines which employ rotating fingers that knock off most of the feathers. The carcasses are washed and scrubbed by machine at one or more stations. Other processes include cutting the head and feet off and eviscerating internal organs.

In one particular operation, known as the venting process, the carcass is moved to a venter module assembly station. The carcass is held by a strap or hooks in place. A probe tip moves axially toward and into the cloaca of the bird while a rotating cylindrical venting blade cuts the skin and meat around the cloaca. As the probe tip is removed, the cloaca, bursa and the large intestine are together removed from the carcass of the bird.

It is required to remove the entire cloaca, bursa and the large intestine and to remove extraneous material. For example, government regulations such as 9 CFR §381.76 describe federal standards for inspection and standards for nonconformance.

The cloaca, bursa and large intestine are removed and separated from the carcass of the bird. These are then discarded as offal or ground and used as protein, such as in pet food.

It has been observed that the skin surrounding the cloaca is extremely loose and tends to gather as the existing cylindrical venting blade engages the carcass, which results in removal of additional skin, meat and fat.

Not only is the meat of the bird valuable but the skin and fat is valuable as well. Accordingly, it is desirable to remove the cloaca and bursa as well as intestine while removing only the minimum amount of meat, skin and fat. To the extent excess meat, skin and fat is removed, it decreases the yield.

Accordingly, it is a principal object and purpose of the present invention to provide an improved venting blade assembly for poultry processing.

It is a further object and purpose of the present invention to improve yield of the poultry during processing while meeting all pertinent regulations and codes.

It is a further object and purpose of the present invention to minimize removal of excess meat, fat and skin during the venting process while maximizing yield.

SUMMARY OF THE INVENTION

The present invention is directed to a venting blade assembly for use in the venting operation during poultry processing. The venting blade assembly includes a projecting cylindrical barrel having a first open end. An opposed second end of the cylindrical barrel includes an attachment mechanism in order to attach to an axial advancement and rotation mechanism.

The open first end of the cylindrical barrel terminates in a flat circular abutment shoulder substantially perpendicular to the cylindrical barrel.

A beveled circular edge is also provided at the first end of the cylindrical barrel between a flat abutment shoulder and the external surface of the cylindrical barrel.

A plurality of helical recesses are provided or formed in the first end of the cylindrical barrel to form a plurality of cutting tips. The venting blade assembly also includes a synthetic insert that fits within the cylindrical barrel.

BRIEF DESCRIPTION OF THE DRAWINGS

FIG. 5 illustrates a top view,

FIG. 6 illustrates a side view,

FIG. 7 illustrates a sectional view taken along section line 7-7 of FIG. 6;

FIG. 8 illustrates a perspective view of a second preferred embodiment of the venting blade assembly of the present invention;

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
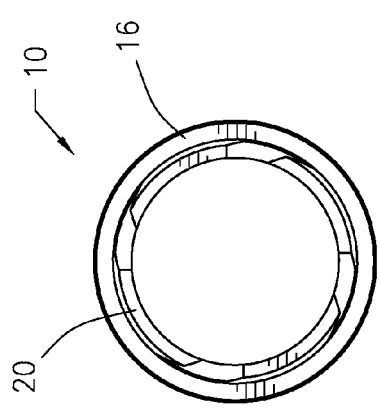
FIG. 1 illustrates a top view.
Figure 4:
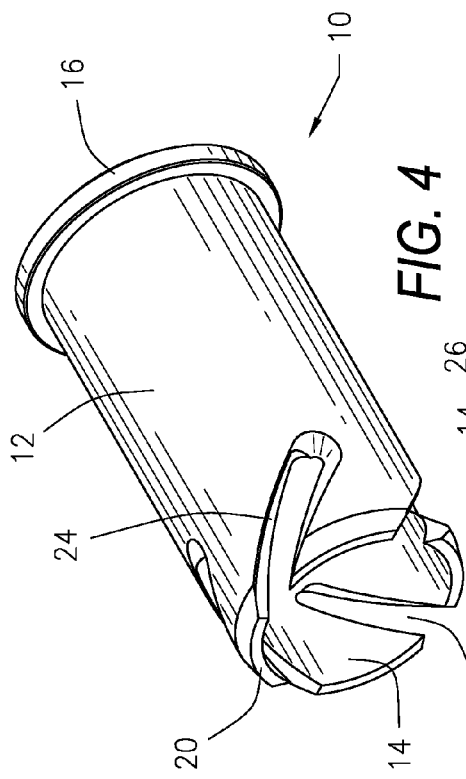
FIG. 4 illustrates a perspective view of a first preferred embodiment of a venting blade assembly constructed in accordance with the present invention.
Figure 2:
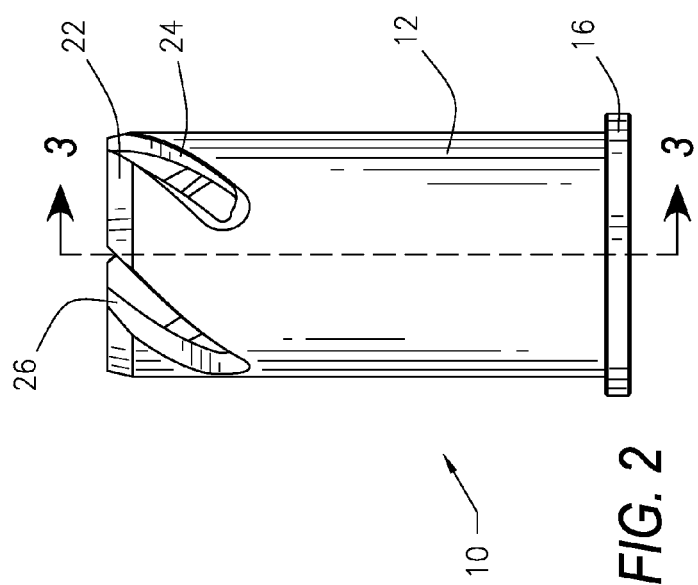
FIG. 2 illustrates a side view.
Figure 3:
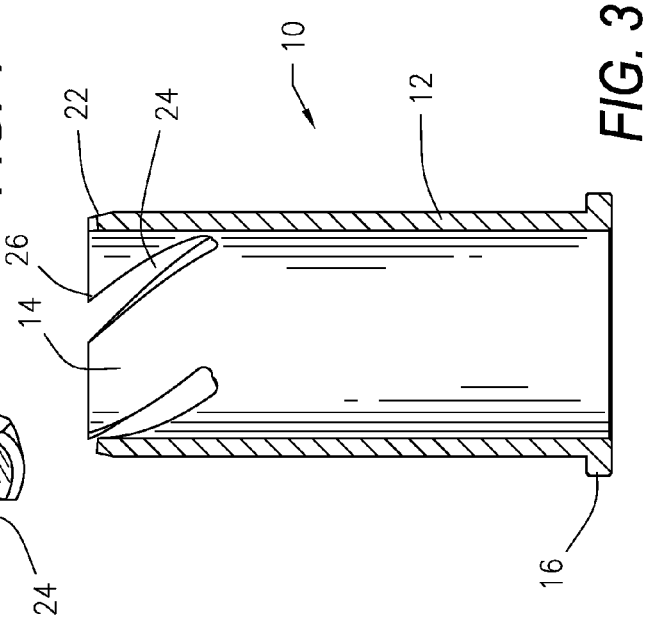
FIG. 3 illustrates a sectional view taken along section line 3-3 of FIG. 2.

Referring to the drawings in detail, FIGS. 1 through 4 illustrate a first preferred embodiment of a venting blade assembly 10 constructed in accordance with the present invention. FIG. 1 illustrates a top view, FIG. 2 illustrates a side view, and FIG. 4 illustrates a perspective view of a first preferred embodiment of the venting blade assembly. FIG. 3 illustrates a sectional view taken along section line 3-3 of FIG. 2.

The venting blade assembly 10 has a projecting cylindrical barrel 12 having a first open end 14. The venting blade assembly 10 also includes an attachment mechanism to attach an opposed second end of the cylindrical barrel 12 to an axial advancement and rotation mechanism (not shown in FIGS. 1 through 4). In the embodiment shown in FIGS. 1 through 4, the attachment mechanism includes a radially extending flange 16.

The open first end 14 of the cylindrical barrel terminates in a flat circular abutment shoulder 20 which can best be observed in FIGS. 1 and 4. The flat circular abutment shoulder 20 is substantially perpendicular to the cylindrical barrel 12. It has been found that a width of the shoulder of between 1 to 1½ millimeters is preferred. As will be described herein, the flat circular abutment shoulder 20 will initially engage the carcass of the poultry as the cylindrical barrel is axially advanced.

A beveled circular edge 22 is also provided at the first end 14 between the flat abutment shoulder 20 and the external surface of the cylindrical barrel 12.

A plurality of helical recesses 24 are provided or formed in the first end 14 of the cylindrical barrel which form a plurality of cutting tips 26.

The venting blade assembly 10 also includes a synthetic insert 18 (not shown in FIGS. 1 through 4) that fits within the cylindrical barrel 12.

FIGS. 5 through 8 illustrate a second preferred embodiment 30 of the venting blade assembly of the present invention. FIG. 5 illustrates a top view. FIG. 6 illustrates a side view, and FIG. 8 illustrates a perspective view of the second preferred embodiment 30 of the venting blade assembly. FIG. 7 illustrates a sectional view taken along section line 7-7 of FIG. 6.

The venting blade assembly 30 includes a projecting cylindrical barrel 32 having an open first end 34, as best seen in FIGS. 7 and 8. The venting blade assembly 30 also includes an attachment mechanism to attach an opposed second end of the cylindrical barrel 32 to an axial advancement and rotation mechanism (not shown in FIGS. 5 through 8). The attachment mechanism includes internal threads 36 at the opposed second end of the cylindrical barrel 32.

The open first end 34 of the venting blade assembly 30 terminates in a flat circular abutment shoulder 40 which can be best observed in FIGS. 5 and 8. The abutment shoulder 40 is substantially perpendicular to the cylindrical barrel 32. As will be described herein, the flat circular abutment shoulder 40 will initially engage the carcass of the poultry as the cylindrical barrel is axially advanced.

The venting blade assembly 30 also includes a beveled circular edge at the first end 34 of the cylindrical barrel. The beveled circular edge 42 extends between the flat circular abutment shoulder 40 and the external diameter of the cylindrical barrel 32.

A plurality of helical recesses 44 are provided or formed in the first end 34 of the cylindrical barrel 32 forming a plurality of cutting tips 46.

The venting blade assembly 30 also includes a synthetic insert 38 that fits within the cylindrical barrel 32.

Figure 9:
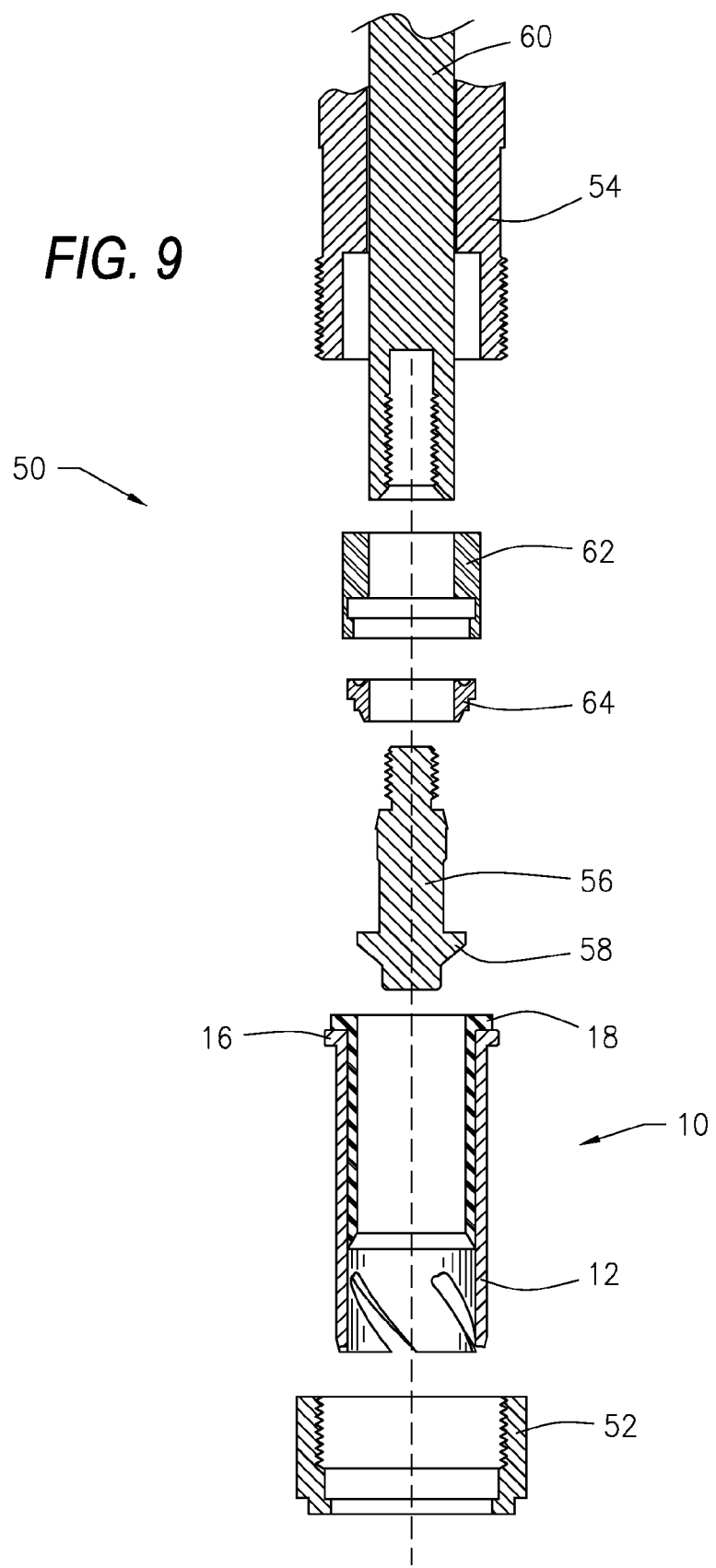
FIG. 9 illustrates a partial, sectional view of the venting blade assembly along with portions of a venter module.

FIG. 9 illustrates a partial, sectional view of the venting blade assembly 10 shown in FIGS. 1 through 4 along with a portion of the venter module assembly 50.

A venting blade nut 52 captures the flange 16 of the venting blade assembly. The nut 52 has internal threads which threadably engage external threads on a venting blade shaft 54 which is capable of rotational and axial movement.

A probe tip 56 has a radially extending wing 58. The diameter of the wing 58 is slightly less than the diameter of the inside of the cylindrical barrel and the insert 18. The probe tip 56 is threadably connected to a drill shaft which is capable of axially oscillating the probe tip. The probe tip does not rotate.

A guide bushing 62 resides within an opening of the venting blade shaft. A flexible probe shaft guide 64 permits movement of the probe tip therein.

FIGS. 10 through 14 illustrate the sequential procedure to use the venting blade assembly of the present invention.

As the carcass of the poultry bird proceeds through the various processing operations, the carcass of a bird is moved by a conveyor to adjacent the venter module assembly 50 where it is held in place by a strap or hooks (not shown).

The venting blade assembly 10 and the probe tip 56 are moved axially as shown in FIG. 9.

The venting blade assembly 10 is rotated by rotation of a venting blade shaft 54. The venting blade shaft 54 also moves axially toward the bird carcass 70 so that the abutment shoulder 20 engages an area outside of the cloaca. The flat abutment shoulder 20 puts pressure or tension on the skin of the carcass 70 while the blade begins to cut the skin, fat and meat surrounding the cloaca. The flat abutment shoulder prevents excessive gathering of the skin, fat, and meat.

Figures 10, 11, 12:
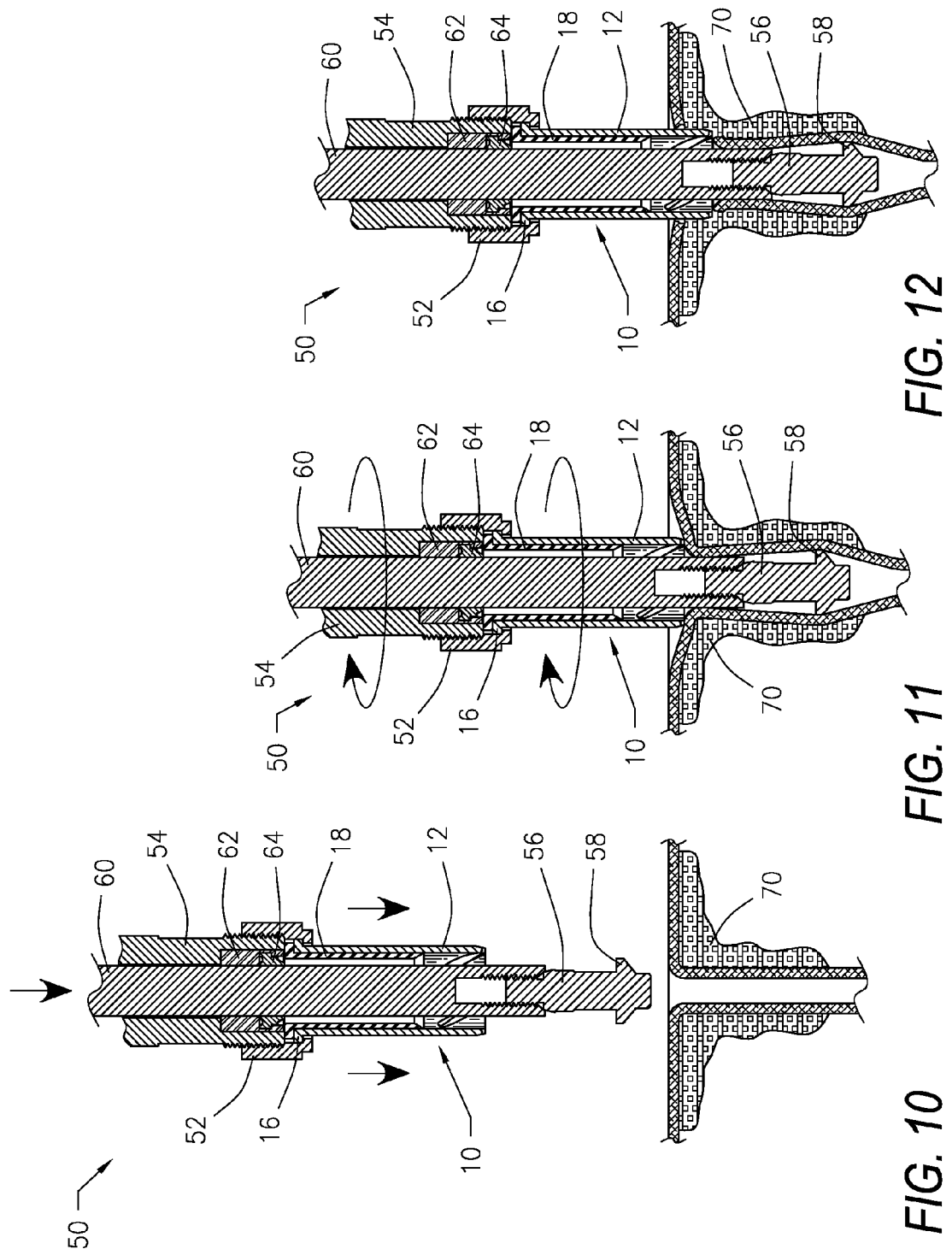
FIGS. 10, 11, 12, 13, and 14 illustrate a sequential procedure to use the venting blade assembly of the present invention.

The probe tip 56 is moved axially by the drill shaft 60 so that the radially extending wing 58 enters and is within the cloaca as shown in FIG. 12.

Figure 14:
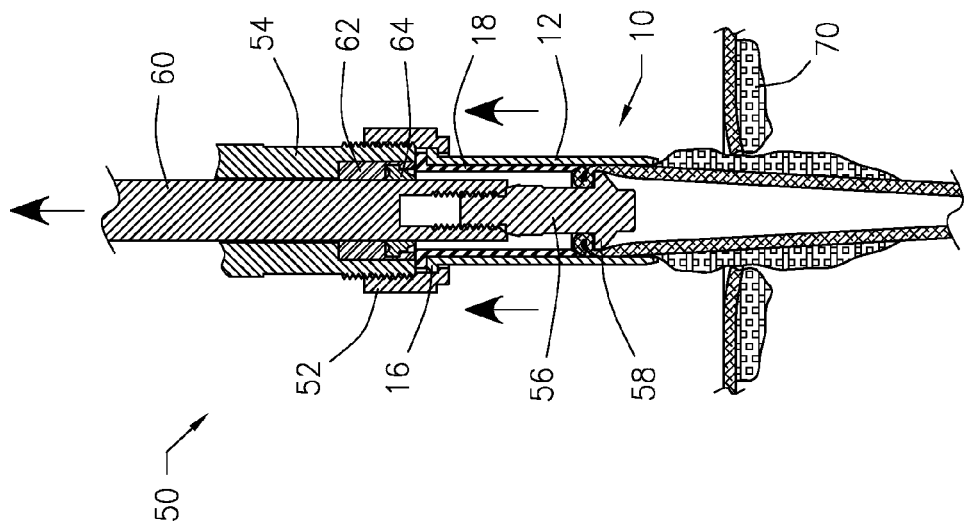
Figure 13:
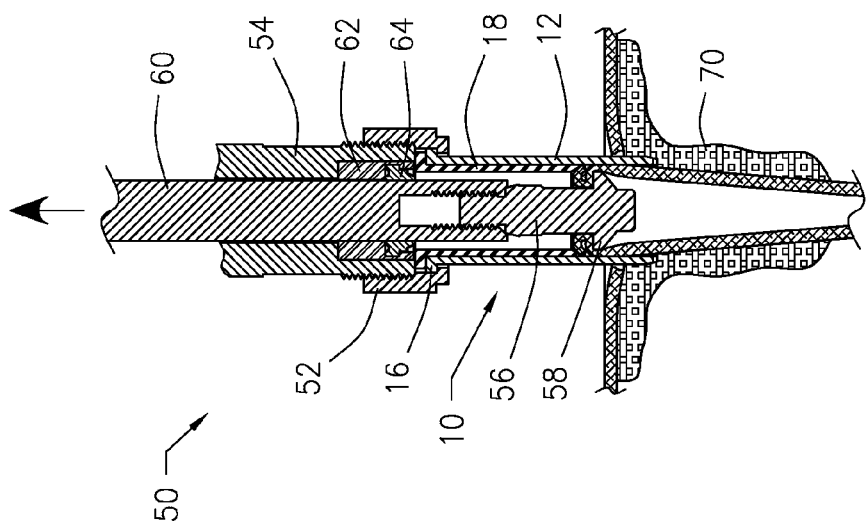

Finally, as seen in FIGS. 13 and 14, as the probe tip is thereafter removed by moving the drill shaft 60 axially, the cloaca is trapped between the wing 58 of the probe tip and the cylindrical barrel and insert 18 of the venting blade assembly. Since the cloaca has been loosened or cut free from the carcass, the entire cloaca, bersa and large intestine is lifted up outside of the carcass. Subsequently, the cloaca, large intestine and bersa are separated and removed from the carcass (not shown).

The present invention not only efficiently performs the venting process but removes the minimum amount of excess skin, fat and meat.

Whereas, the present invention has been described in relation to the drawings attached hereto, it should be understood that other and further modifications, apart from those shown or suggested herein, may be made within the spirit and scope of this invention.

What is claimed is:

1. A venting blade assembly for poultry processing, which assembly comprises:
   a projecting cylindrical barrel having an open first end;
   an attachment mechanism to attach an opposed second end of said cylindrical barrel to an axial advancement and rotation mechanism;
   a flat circular abutment shoulder of said first end substantially perpendicular to said cylindrical barrel to engage said poultry;
   a beveled circular edge of said first end of said cylindrical barrel; and
   a plurality of helical recesses in said first end of said cylindrical barrel forming a plurality of cutting tips.

2. A venting blade assembly as set forth in claim 1 wherein said attachment mechanism includes internal threads on said second end of said cylindrical barrel.

3. A venting blade assembly as set forth in claim 1 wherein said second end of said cylindrical barrel includes a flange and said attachment mechanism includes a threaded nut which engages a blade shaft.

4. A venting blade assembly as set forth in claim 1 including a probe tip oscillated axially within said cylindrical barrel.

5. A venting blade assembly as set forth in claim 1 wherein said axial advancement and rotation mechanism includes a blade shaft which engages a motor.

6. A venting blade assembly for a venter module assembly having a blade shaft rotated and axially oscillated, a probe tip having a radially extending wing wherein said probe tip is oscillated axially by a probe shaft, which venting blade assembly comprises:
- a projecting cylindrical barrel having an open first end;
- an attachment mechanism to attach an opposed second end of said cylindrical barrel to said blade shaft;
- a flat circular abutment shoulder of said first end substantially perpendicular to said cylindrical barrel to engage said poultry;
- a beveled edge of said first end; and
- a plurality of helical recesses in said first end of said barrel forming a plurality of cutting tips.

7. A venting blade assembly as set forth in claim 6 wherein said attachment mechanism includes internal threads on said second end of said cylindrical barrel.

8. A venting blade assembly as set forth in claim 6 wherein said second end of said cylindrical barrel includes a flange and said attachment mechanism includes a threaded nut which engages a blade shaft.

9. A venting blade assembly as set forth in claim 6 including a probe tip oscillated axially within said cylindrical barrel.

\* \* \* \* \*